(12) United States Patent
Morisaki

(10) Patent No.: US 10,486,691 B2
(45) Date of Patent: Nov. 26, 2019

(54) HYBRID VEHICLE AND CONTROL METHOD OF HYBRID VEHICLE

(71) Applicant: TOYOTA JIDOSHA KABUSHIKI KAISHA, Toyota-shi, Aichi-ken (JP)

(72) Inventor: Keisuke Morisaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 229 days.

(21) Appl. No.: 15/624,766

(22) Filed: Jun. 16, 2017

(65) Prior Publication Data

US 2017/0361837 A1 Dec. 21, 2017

(30) Foreign Application Priority Data

Jun. 20, 2016 (JP) ................................. 2016-121713

(51) Int. Cl.
*B60W 30/06* (2006.01)
*B60W 20/13* (2016.01)
(Continued)

(52) U.S. Cl.
CPC ............... *B60W 30/06* (2013.01); *B60K 6/20* (2013.01); *B60K 6/445* (2013.01); *B60R 16/033* (2013.01); *B60W 10/06* (2013.01); *B60W 10/08* (2013.01); *B60W 10/26* (2013.01); *B60W 10/30* (2013.01); *B60W 20/10* (2013.01); *B60W 20/13* (2016.01); *B60W 20/15* (2016.01); *B60W 30/182* (2013.01); *B60W 30/1843* (2013.01); *B60W 30/1886* (2013.01); *B60W 30/194* (2013.01); *B62D 15/027* (2013.01); *F02N 11/0807* (2013.01); *F02N 11/0818* (2013.01); *F02N 11/0837* (2013.01); *B60W 2050/0064* (2013.01); *B60W 2050/0089* (2013.01); *B60W 2510/0676* (2013.01); *B60W 2510/087* (2013.01); *B60W 2510/244* (2013.01); *B60W 2510/305* (2013.01); *B60W 2540/10* (2013.01); *B60W 2550/402* (2013.01); *B60W 2710/06* (2013.01);
(Continued)

(58) Field of Classification Search
None
See application file for complete search history.

(56) References Cited

U.S. PATENT DOCUMENTS

2009/0101421 A1 4/2009 Oyobe et al.
2010/0280687 A1* 11/2010 Tate, Jr. ................ B60W 10/06
701/22
(Continued)

FOREIGN PATENT DOCUMENTS

DE 10 2014 220 123 A1 4/2016
JP 2007-062638 A 3/2007
(Continued)

*Primary Examiner* — Jonathan M Dager
*Assistant Examiner* — Garrett F Evans
(74) *Attorney, Agent, or Firm* — Finnegan, Henderson, Farabow, Garrett & Dunner, LLP

(57) ABSTRACT

An electronic control unit of a hybrid vehicle is configured to determine whether or not parking operation of the hybrid vehicle is being performed. The electronic control unit is configured to control the engine and the rotary electric machine such that starting the engine when the parking operation of the hybrid vehicle is being performed is harder than starting the engine when the parking operation of the hybrid vehicle is not being performed.

10 Claims, 13 Drawing Sheets

(51) Int. Cl.

| | | |
|---|---|---|
| *B60K 6/20* | (2007.10) | |
| *B60R 16/033* | (2006.01) | |
| *B60W 10/06* | (2006.01) | |
| *B60W 10/08* | (2006.01) | |
| *B60W 10/30* | (2006.01) | |
| *B60W 20/10* | (2016.01) | |
| *B60W 30/182* | (2012.01) | |
| *B60W 30/188* | (2012.01) | |
| *B62D 15/02* | (2006.01) | |
| *F02N 11/08* | (2006.01) | |
| *B60W 20/15* | (2016.01) | |
| *B60K 6/445* | (2007.10) | |
| *B60W 10/26* | (2006.01) | |
| *B60W 30/184* | (2012.01) | |
| *B60W 30/194* | (2012.01) | |
| *B60W 50/00* | (2006.01) | |

(52) U.S. Cl.
 CPC ..... *B60W 2710/08* (2013.01); *B60W 2710/30* (2013.01); *B60Y 2200/92* (2013.01); *B60Y 2300/182* (2013.01); *B60Y 2300/188* (2013.01); *F02N 11/0822* (2013.01); *F02N 11/0829* (2013.01); *F02N 2200/023* (2013.01); *F02N 2200/046* (2013.01); *F02N 2200/0801* (2013.01); *F02N 2200/101* (2013.01); *Y02T 10/48* (2013.01); *Y02T 10/6221* (2013.01); *Y10S 903/93* (2013.01)

(56) References Cited

U.S. PATENT DOCUMENTS

| | | | |
|---|---|---|---|
| 2011/0166725 | A1* | 7/2011 | Booth .................. B60K 6/48 701/22 |
| 2013/0231850 | A1 | 9/2013 | Taki |
| 2014/0222252 | A1 | 8/2014 | Matters et al. |
| 2016/0152224 | A1 | 6/2016 | Tabata et al. |
| 2016/0201633 | A1 | 7/2016 | Quinteros |

FOREIGN PATENT DOCUMENTS

| | | |
|---|---|---|
| JP | 2007-203875 A | 8/2007 |
| JP | 2008-279980 | 11/2008 |
| JP | 2010-280379 A | 12/2010 |
| JP | 2011-207300 A | 10/2011 |
| JP | 2011-218863 | 11/2011 |
| JP | 2012-107580 | 6/2012 |
| JP | 2012-166737 A | 9/2012 |
| JP | 2014-172587 | 9/2014 |
| JP | 2016-7959 | 1/2016 |
| JP | 2016-102441 A | 6/2016 |
| WO | WO 2013/053776 A2 | 4/2013 |

\* cited by examiner

HYBRID VEHICLE AND CONTROL METHOD OF HYBRID VEHICLE

INCORPORATION BY REFERENCE

The disclosure of Japanese Patent Application No. 2016-121713 filed on Jun. 20, 2016 including the specification, drawings and abstract is incorporated herein by reference in its entirety.

BACKGROUND

1. Technical Field

The disclosure relates to a hybrid vehicle and a control method of the hybrid vehicle.

2. Description of Related Art

In the related art, various vehicles including a parking assistance device that assists a user's parking operation when a vehicle is being parked at a parking position have been proposed (for example, see Japanese Patent Application Publication No. 2008-279980 (JP 2008-279980 A)).

A technique for operating a vehicle from the outside of the vehicle such that the vehicle moves to a predetermined position in a state in which a user is outside the vehicle has been proposed (for example, see Japanese Patent Application Publication No. 2016-007959 (JP 2016-007959 A)).

In a hybrid vehicle described in Japanese Patent Application Publication No. 2011-218863 (JP 2011-218863 A)), parking assistance is performed in a state in which an engine has stopped, and the parking assistance is prohibited when there is not a certain degree of margin in a residual amount of battery power at the time of starting the parking assistance. Accordingly, after the vehicle stops, the electric power required for starting the engine is guaranteed.

SUMMARY

As described in JP 2011-218863 A, during parking assistance, there are many cases in which the engine stops and the vehicle travels with a driving force of a motor based on the electric power of a battery. Accordingly, a user expects that the parking assistance will be performed in a state in which the engine has stopped.

On the other hand, when the parking assistance is performed using only the driving force from the motor, it may be necessary to drive the engine depending on various requirements such as a required torque or an engine warm-up which is required for causing the vehicle to travel. When the engine starts contrary to the user's expectation during parking assistance due to various requirements, the user may feel uneasy.

The disclosure provides a hybrid vehicle in which starting of an engine is prevented during parking assistance and a control method of the hybrid vehicle.

An example aspect of the present disclosure provides a hybrid vehicle. The hybrid vehicle includes a battery, an engine, a rotary electric machine that is electrically connected to the battery and is mechanically connected to the engine, and an electronic control unit configured to control the engine and the rotary electric machine. The electronic control unit is configured to determine whether or not parking operation of the hybrid vehicle is being performed. The electronic control unit is configured to control the engine and the rotary electric machine such that starting the engine when the parking operation of the hybrid vehicle is being performed is harder than starting the engine when the parking operation of the hybrid vehicle is not being performed. An example aspect of the present disclosure provides a control method for a hybrid vehicle. The hybrid vehicle includes a battery, an engine, a rotary electric machine electrically connected to the battery, the rotary electric machine mechanically connected to the engine, and an electronic control unit. The control method includes (i) determining, by the electronic control unit, whether or not parking operation of the hybrid vehicle is being performed, and (ii) controlling, by the electronic control unit, the engine and the rotary electric machine such that starting the engine when the parking operation of the hybrid vehicle is being performed is harder than starting the engine when the parking operation of the hybrid vehicle is not being performed.

According to the hybrid vehicle, when the parking operation of the hybrid vehicle is being performed, it is harder than start the engine. Accordingly, starting of the engine can be prevented while the hybrid vehicle is being parked. Also according to the hybrid vehicle, the user and people around the hybrid vehicle can prevent to feel uneasy from start of the engine.

In the hybrid vehicle, the parking operation may include a parking control by a user. The parking control may include a parking assistance request from the user. The electronic control unit may be configured to perform parking assistance control for assisting parking of the hybrid vehicle to a target parking position when the parking assistance request is issued. The electronic control unit may be configured to control the engine and the rotary electric machine such that starting the engine when the parking assistance control of the hybrid vehicle is being performed is harder than starting the engine when the parking assistance control of the hybrid vehicle is not being performed.

According to the hybrid vehicle, when the parking assistance control is performed, it is harder than start the engine and thus starting of the engine is prevented.

In the hybrid vehicle, the electronic control unit may be configured to perform control for starting the engine when a required power required for the hybrid vehicle is equal to or greater than a start threshold value. The electronic control unit may be configured to set the start threshold value such that the start threshold value when the parking assistance control is being performed is greater than the start threshold value when the parking assistance control is not being performed.

According to the hybrid vehicle, since the start threshold value when the parking assistance control is performed is greater, it is harder than start the engine. Accordingly, it is possible to prevent starting of the engine.

The hybrid vehicle may further include a detector that detects a temperature of the engine. The electronic control unit may be configured to perform control for starting the engine when the temperature detected by the detector is lower than a predetermined temperature. The electronic control unit may be configured to set the predetermined temperature such that the predetermined temperature when the parking assistance control is being performed is lower than the predetermined temperature when the parking assistance control is not being performed.

According to the hybrid vehicle, when the temperature of the engine is lower than the predetermined temperature, the engine is started to warm up the engine. When the parking assistance is performed, the predetermined temperature at which the engine is started becomes lower and it is harder than start the engine. Accordingly, it is possible to prevent starting of the engine during parking assistance.

The hybrid vehicle may further include a detector that detects a temperature of the rotary electric machine. The electronic control unit may be configured to perform control for starting the engine when the temperature detected by the detector is higher than a predetermined temperature. The electronic control unit may be configured to set the predetermined temperature such that the predetermined temperature when the parking assistance control is being performed is higher than the predetermined temperature when the parking assistance control is not being performed.

According to the hybrid vehicle, when the parking assistance control is performed, the predetermined temperature at which the engine is started becomes higher and thus the temperature of the engine is unlikely to be higher than the predetermined temperature. That is, it is harder than start the engine by increasing the predetermined temperature and it is thus possible to prevent starting of the engine while performing the parking assistance control.

In the hybrid vehicle, the electronic control unit may be configured to perform control for causing the rotary electric machine to generate power with a driving force from the engine and charging the battery when a value indicating a state of charge of the battery is less than a threshold value. The electronic control unit may be configured to set the threshold value such that the threshold value when the parking assistance control is being performed is less than the threshold value when the parking assistance control is not being performed.

According to the hybrid vehicle, when the parking assistance control is performed, the threshold value for starting the engine decreases and thus it is harder than start the engine. Accordingly, it is possible to prevent starting of the engine during parking assistance.

An example aspect of the present disclosure provides a hybrid vehicle. The hybrid vehicle includes a battery, an engine that outputs power, a rotary electric machine that is electrically connected to the battery and is mechanically connected to the engine, an air conditioner that is driven with power from the battery, and an electronic control unit. The electronic control unit is configured to perform parking assistance control for causing the hybrid vehicle to travel to a target parking position when a parking assistance request is issued from a user. The electronic control unit is configured to perform control for starting the engine when a required power required for the hybrid vehicle including electric power required for driving the air conditioner is equal to or greater than a start threshold value. The electronic control unit is configured to perform control for prohibiting driving of the air conditioner when the parking assistance control is being performed.

According to the hybrid vehicle, since driving of the air conditioner is prohibited during parking assistance, a state in which the air conditioner stopped is maintained when the air conditioner is stopped, and the air conditioner is stopped when the air conditioner is being driven. When the air conditioner is stopped, the required power required for the vehicle is lower than when the air conditioner is driven. Accordingly, the required power is unlikely to be equal to or greater than the start threshold value and it is possible to prevent starting of the engine during parking assistance.

An example aspect of the present disclosure provides a hybrid vehicle. The hybrid vehicle includes a battery, an engine that outputs power, a rotary electric machine that gives and receives electric power with the battery, and an electronic control unit configured to perform control for causing the hybrid vehicle to travel while switching between a charge depleting (CD) mode and a charge sustaining (CS) mode. The electronic control unit is configured to perform parking assistance control for causing the hybrid vehicle to travel to a target parking position when a parking assistance request is issued from a user. The electronic control unit is configured to select the CD mode when the parking assistance control is being performed.

In the hybrid vehicle, in the CS mode, traveling of the hybrid vehicle is controlled such that the state of charge (SOC) is sustained, for example, the SOC is sustained within a range between an upper-limit threshold value and a lower-limit threshold value including a control center SOC. On the other hand, in the CD mode, traveling of the hybrid vehicle is controlled such that the SOC decreases with an increase in traveling distance with the SOC not being sustained. In the CD mode, the hybrid vehicle travels actively using the power stored in the battery. Accordingly, an engine start frequency is less when the CD mode is selected than when the CS mode is selected.

According to the hybrid vehicle, when the parking assistance control is performed, the CD mode is selected. Accordingly, it is possible to prevent starting of the engine when the parking assistance control is performed.

An example aspect of the present disclosure provides a hybrid vehicle. The hybrid vehicle includes a battery, an engine that outputs power, a rotary electric machine that is electrically connected to the battery and is mechanically connected to the engine, and an electronic control unit. The electronic control unit is configured to perform parking assistance control for causing the hybrid vehicle to travel to a target parking position when a parking assistance request is issued from a user. The electronic control unit is configured to perform control for causing the rotary electric machine to generate power with a driving force from the engine and charging the battery when a value indicating a state of charge of the battery is less than a threshold value. The electronic control unit is configured to store a point at which the parking assistance control has been performed as an assistance history point. The electronic control unit is configured to perform control for charging the battery when a distance between the assistance history point and the hybrid vehicle is equal to or less than a predetermined distance such that the value indicting the state of charge of the battery when the hybrid vehicle reaches the assistance history point is equal to or greater than a predetermined value obtained by adding an amount of power required for the parking assistance control to the threshold value.

According to the hybrid vehicle, when the hybrid vehicle reaches the assistance history point, it is possible to guarantee an amount of power required for performing the parking assistance control and to prevent starting of the engine during parking assistance.

According to the hybrid vehicle of the disclosure, it is possible to prevent starting of the engine when the hybrid vehicle is parked.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hybrid vehicles according to embodiments of the disclosure will be described below with reference to FIGS. 1 to 16. In FIGS. 1 to 16, identical elements and substantially identical elements will be referenced by identical reference signs and description thereof will not be repeated. (First Embodiment) A hybrid vehicle 1 according to a first embodiment and a parking assistance system 2 including the hybrid vehicle 1 will be described below with reference to FIGS. 1 to 6.

Figure 1:
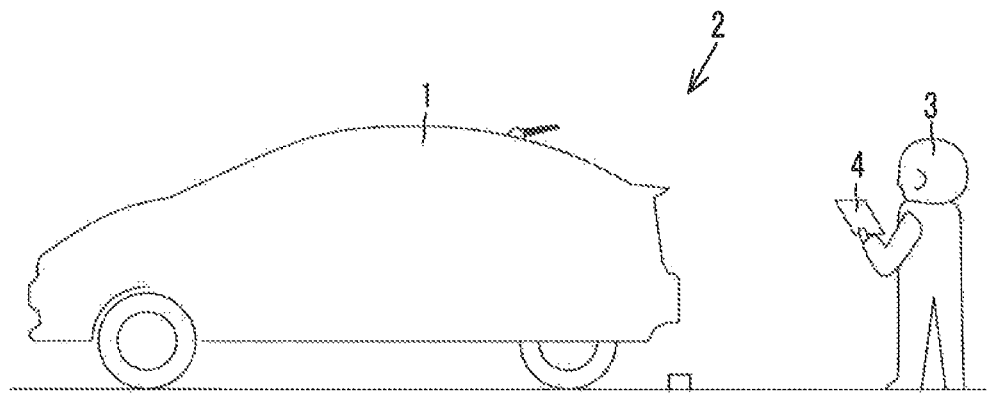
FIG. 1 is a diagram schematically illustrating a parking assistance system.

FIG. 1 is a diagram schematically illustrating the parking assistance system 2. As illustrated in FIG. 1, the parking assistance system 2 includes a hybrid vehicle 1 and a mobile terminal 4. In the parking assistance system 2, a user 3 parks the hybrid vehicle 1 in a predetermined place using the mobile terminal 4 from the outside of the vehicle.

Figure 2:
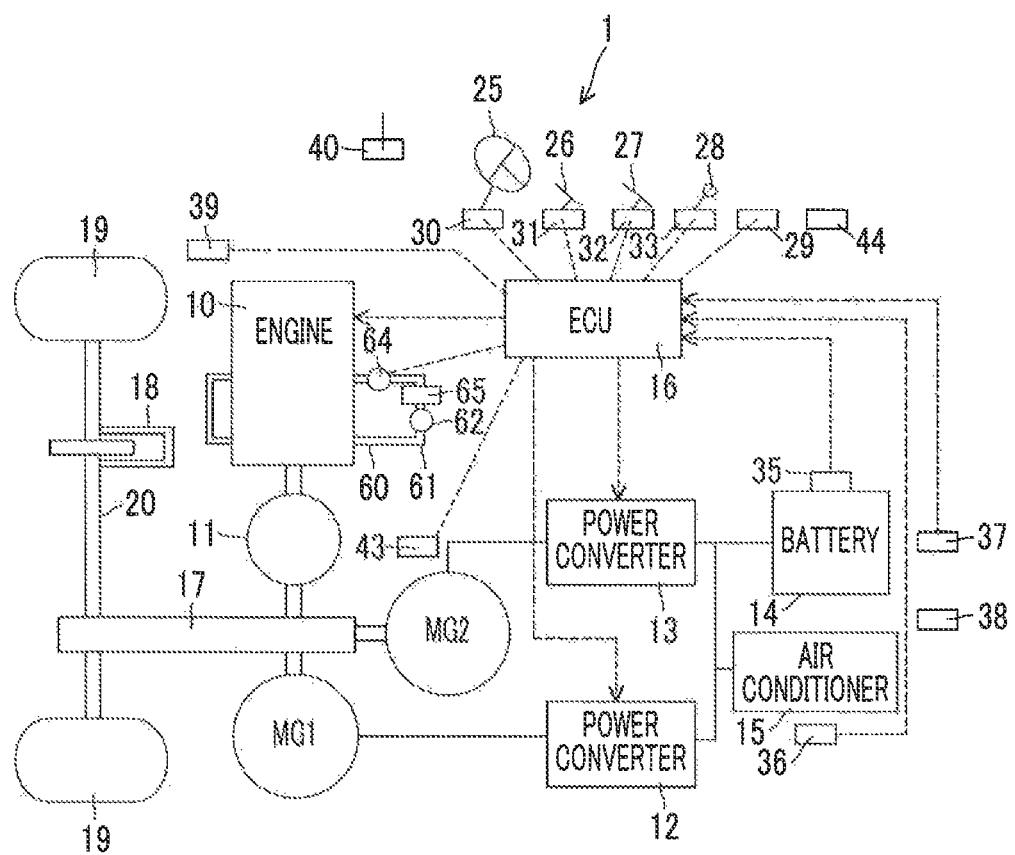
FIG. 2 is a block diagram illustrating a hybrid vehicle.

FIG. 2 is a block diagram illustrating the hybrid vehicle 1. As illustrated in FIG. 2, the hybrid vehicle 1 includes an engine 10, an rotary electric machine MG1, an rotary electric machine MG2, a power split mechanism 11, converters 12 and 13, a battery 14, an air conditioner 15, an electronic control unit (ECU) 16, a transmission gear 17, a braking device 18, vehicle wheels 19, and a shaft 20.

The engine 10 generates power using fuel supplied thereto. The power split mechanism 11 is mechanically connected to the engine 10, the rotary electric machine MG1, and the transmission gear 17. The power split mechanism 11 splits a driving force from the engine 10 to the rotary electric machine MG1 and the transmission gear 17.

The power split mechanism 11 is a planetary gear mechanism including a sun gear, a ring gear, a planetary carrier, and a pinion gear.

The rotary electric machine MG1 is electrically connected to the battery 14 and is mechanically connected to the engine 10. The rotary electric machine MG1 functions as a power generator that generates power with the driving force from the engine 10 and functions as a power source for driving the engine 10 when cranking the engine 10. The power generated by the rotary electric machine MG1 is supplied to the battery 14 via the converter 12.

The rotary electric machine MG2 is mechanically connected to the transmission gear 17. The rotary electric machine MG2 functions as a drive source that generates a driving force for driving the vehicle wheels 19 and functions as a power generator at the time of regeneration.

When the rotary electric machine MG2 functions as a drive source, the converter 13 converts DC power from the battery 14 into AC power and supplies the AC power to the rotary electric machine MG2. When the rotary electric machine MG2 regenerates power, the converter 13 converts AC power supplied from the rotary electric machine MG2 into DC power and supplies the DC power to the battery 14. The rotary electric machine MG2 is also mechanically connected to the engine 10 via the transmission gear 17 and the power split mechanism 11, and the rotary electric machine MG2 is electrically connected to the battery 14 via the converter 13.

The battery 14 is a secondary battery which can be charged and discharged with DC power. The air conditioner 15 is driven with power supplied from the battery 14. The air conditioner 15 adjusts a vehicle interior temperature of the hybrid vehicle 1. The shaft 20 is mechanically connected to the transmission gear 17 and the shaft 20 is connected to the vehicle wheels 19.

The braking device 18 is a device that generates a mechanical braking force for the vehicle wheels 19. The braking device 18 is representatively a hydraulic brake that generates a frictional braking force with a supply of a hydraulic pressure. When a brake pedal to be described later is depressed, a total braking force corresponding to depression of the brake pedal is secured by summing a braking force from the braking device 18 and regenerative braking forces from the rotary electric machines MG1 and MG2.

The hybrid vehicle 1 includes a steering wheel 25, an accelerator pedal 26, a brake pedal 27, a shift lever 28, and an operation unit 29 which are operated by a user. The operation unit 29 is representatively a touch panel type liquid crystal screen, can display an image, and can receive an input from a user.

The hybrid vehicle 1 includes a steering angle sensor 30, an opening angle sensor 31, a brake sensor 32, a positioning sensor 33, a current sensor 35, a temperature sensor 36, an imaging unit 37, an object detection sensor 38, a vehicle speed sensor 39, a communication unit 40, a temperature sensor 43, a navigation system 44, and a cooling circuit 60.

The steering angle sensor 30 detects an angle by which the steering wheel 25 is operated. The opening angle sensor 31 detects an accelerator opening level Acc of the accelerator pedal 26, and the brake sensor 32 detects a depression level of the brake pedal 27. The positioning sensor 33 detects a shift position of the shift lever 28.

The current sensor 35 detects an input current to the battery 14 or an output current from the battery 14. The temperature sensor 36 detects a vehicle interior temperature.

The imaging unit 37 is, for example, a camera, and images surroundings of the hybrid vehicle 1. The object detection sensor 38 is, for example, an ultrasonic sensor and detects presence of an object around the hybrid vehicle 1. The vehicle speed sensor 39 senses a vehicle speed of the hybrid vehicle 1. The communication unit 40 communicates with the mobile terminal 4.

The temperature sensor 43 measures a temperature of the rotary electric machine MG2 and transmits the measurement result to the ECU 16.

The cooling circuit 60 includes a cooling pipe 61 in which a coolant for cooling the engine 10 flows, a pump 62 that causes the coolant to circulate, and a radiator 63. A temperature sensor 64 that measures a coolant temperature is disposed in the cooling pipe 61. The engine 10 is cooled by the coolant. The temperature sensor 64 measures the coolant temperature heated by the engine 10 and transmits the measurement result to the ECU 16. The temperature measured by the temperature sensor 64 corresponds to the temperature of the engine 10.

The hybrid vehicle 1 having the above-mentioned configuration performs "engine start/stop switching control" which is performed when the hybrid vehicle 1 travels, "parking assistance control" which is performed when parking assistance is performed, and "start threshold value Pstart setting control."

The "parking assistance control" is performed by allowing the user 3 to operate the mobile terminal 4 from the outside of the hybrid vehicle 1, for example, when the hybrid vehicle 1 is in an IG-ON state and a shift range of the hybrid vehicle 1 is a "P range." When the parking assistance control is performed, the hybrid vehicle 1 automatically starts parking at a set parking position.

In general, the user 3 is accustomed to performing parking assistance without driving the engine 10. Accordingly, when the engine 10 is started by the engine start/stop switching control during parking assistance, the user 3 may feel uneasy (for example, vibration or noise).

Therefore, in the hybrid vehicle 1 according to the first embodiment, the starting condition of the engine 10 is set to a condition that it is harder than start the engine 10 when the parking assistance control is being performed than when the parking assistance control is not being performed.

The engine start/stop switching control, the parking assistance control, and the start threshold value Pstart setting control in this embodiment will be described below.

Figure 3:
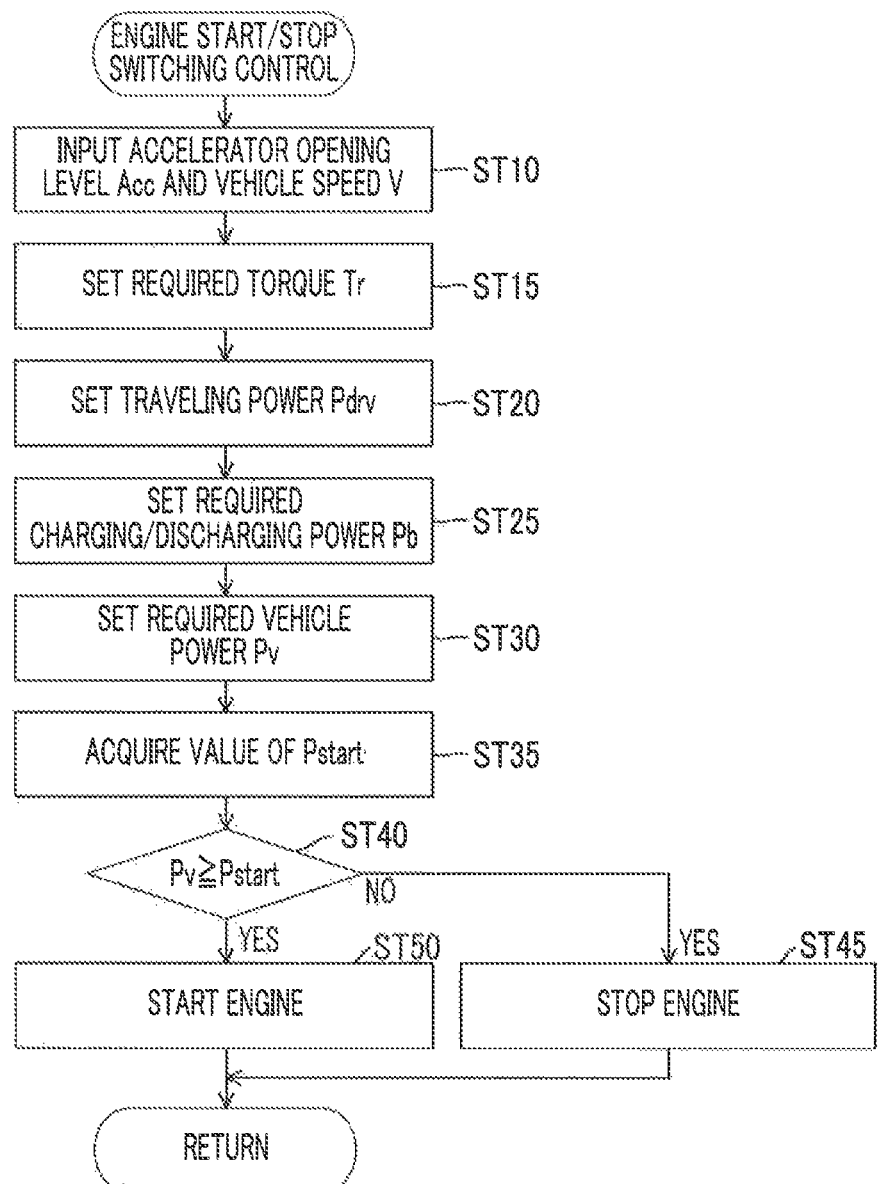
FIG. 3 is a flowchart illustrating start/stop control of an engine.

FIG. 3 is a flowchart illustrating the engine start/stop switching control. As illustrated in FIG. 3, the ECU 16 acquires an accelerator opening level Ace from the opening angle sensor 31 and acquires a vehicle speed V from the vehicle speed sensor 39 (STEP10).

The ECU 16 sets a required torque Tr required for the shaft 20 based on the accelerator opening level Acc and the vehicle speed V (STEP15). The ECU 16 stores a map indicating a relationship between the accelerator opening level Acc, the vehicle speed V, and the required torque Tr.

The ECU 16 sets a traveling power Pdrv required for traveling by multiplying the set required torque Tr by a rotation speed of the shaft 20 (STEP20).

The ECU 16 sets a required charging/discharging power Pb for the battery 14 (STEP25). The required charging/discharging power Pb is calculated based on an SOC calculated by a battery ECU 57. The required charging/discharging power Pb has a positive value when the battery 14 is charged, and has a negative value when power is discharged from the battery 14.

The ECU 16 sets a required vehicle power Pv (STEP30). The required vehicle power Pv is calculated by summing the traveling power Pdrv, the required charging/discharging power Pb, and a power of an auxiliary machine such as the air conditioner 15.

The ECU 16 acquires a value of a start threshold value Pstart (STEP35). The value of the start threshold value Pstart can be appropriately changed and details thereof will be described later.

When the start threshold value Pstart is acquired, the ECU 16 compares the required vehicle power Pv with the start threshold value Pstart (STEP40).

When the required vehicle power Pv is less than the start threshold value Pstart (NO in STEP40), the ECU 16 stops the engine 10 (STEP45). The stopped state of the engine 10 is maintained when the engine 10 is stopped, and the engine 10 is stopped when the engine 10 is started.

When it is determined in STEP40 that the required vehicle power Pv is equal to or greater than the start threshold value Pstart, the ECU 16 starts the engine 10 (STEP50). The driving of the engine 10 is maintained when the engine 10 has been started, and the engine 10 is started when the engine 10 is stopped.

Figure 4:
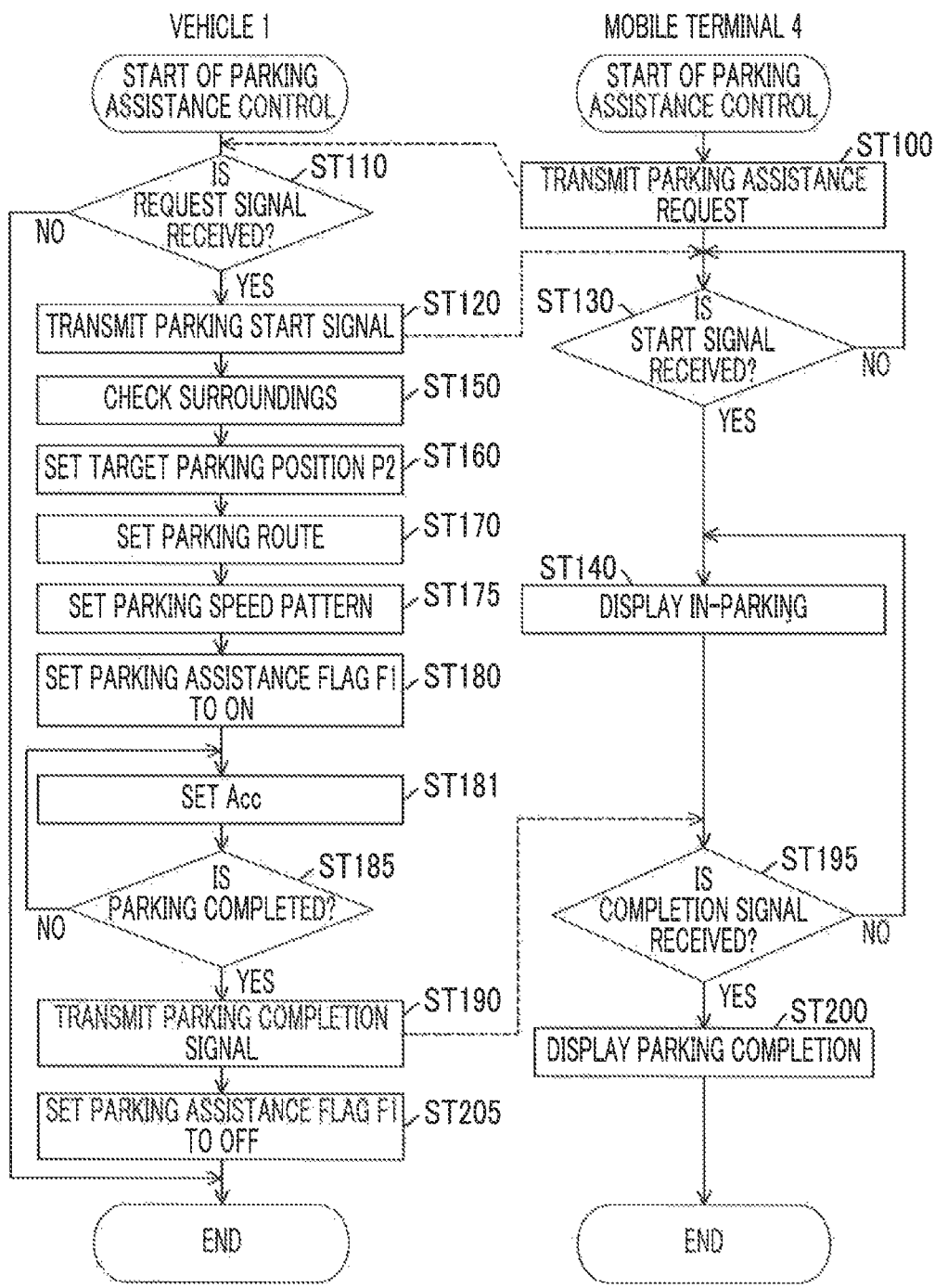
FIG. 4 is a flowchart illustrating parking assistance control.

The "parking assistance control" will be described below. FIG. 4 is a flowchart illustrating the parking assistance control, and FIG. 5 is a diagram schematically illustrating a traveling route on which the hybrid vehicle 1 travels in the parking assistance control.

Figure 5:
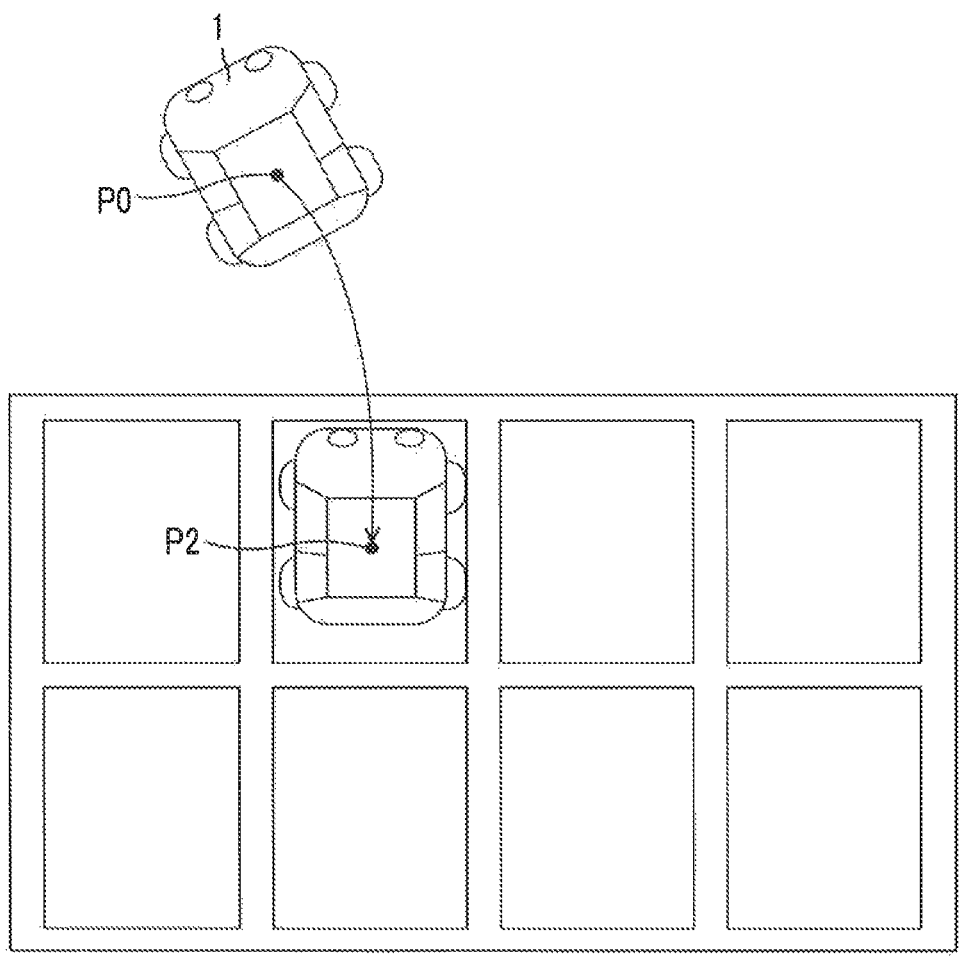
FIG. 5 is a diagram schematically illustrating a traveling route on which the hybrid vehicle travels in parking assistance control.

As illustrated in FIG. 5, a case in which the hybrid vehicle 1 is caused to travel reversely from a parking traveling start position P0 to a target parking position P2.

The parking assistance control illustrated in FIG. 4 is started when the user 3 operates the mobile terminal 4. First, in FIG. 4, when the user 3 operates the mobile terminal 4, a request signal for parking assistance is transmitted from the mobile terminal 4 (STEP100).

When the ECU 16 detects that the request signal is received (YES in STEP110), the ECU 16 transmits a parking start signal to the mobile terminal 4 (STEP120). When the parking start signal is received (YES in STEP130), the mobile terminal 4 displays an "in-parking" message on a display unit of the mobile terminal 4 (STEP140).

After transmitting the parking start signal, the ECU 16 detects surroundings of the hybrid vehicle 1 (STEP150). Specifically, an object such as a vehicle around the hybrid vehicle 1 is detected based on an output signal from an object detection sensor 38.

The ECU 16 sets the target parking position P2 (STEP160). Specifically, the ECU 16 detects a white line of a parking frame based on an image from the imaging unit 37 and sets the target parking position P2. The request signal from the mobile terminal 4 may include position information of the target parking position P2.

Then, the ECU 16 sets a traveling route on which the hybrid vehicle 1 travels from the parking traveling start position P0 to the target parking position P2 (STEP170). As illustrated in FIG. 5, a parking route in which the vehicle travels reversely from the parking traveling start position P0 to the target parking position P2 is set.

The ECU 16 sets the parking route to avoid an obstacle detected by the object detection sensor 38. After setting the parking route, the ECU 16 sets a parking speed pattern (STEP175).

Then, the ECU 16 sets a parking assistance flag F1 to an ON state (STEP180). The ECU 16 sets an accelerator opening level Acc based on the set parking speed pattern (STEP181). The ECU 16 repeatedly sets the accelerator opening level Ace based on the parking speed pattern until the parking is completed. When the ECU 16 determines that the hybrid vehicle 1 is located at the target parking position P2 (YES in STEP185), the ECU 16 transmits a parking completion signal to the mobile terminal 4 (STEP190). The mobile terminal 4 displays the in-parking message until the parking completion signal is received, and displays a parking completion message when the parking completion signal is received (STEP200).

When the parking completion signal is transmitted, the ECU 16 switches the parking assistance flag F1 to an OFF state (STEP205). Accordingly, when the parking assistance control is not being performed, the parking assistance flag F1 is set to the OFF state.

Figure 6:
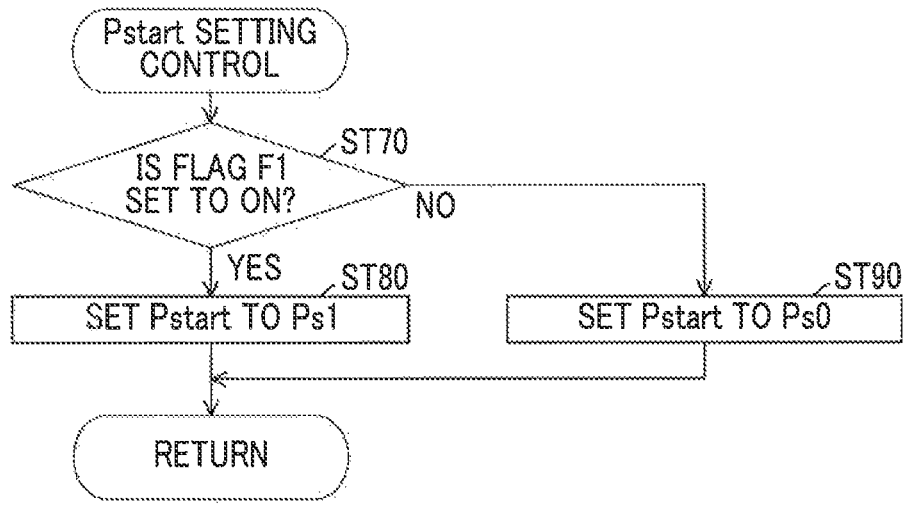
FIG. 6 is a flowchart illustrating start threshold value setting control.

FIG. 6 is a flowchart illustrating the start threshold value Pstart setting control. This setting control is repeatedly performed at predetermined intervals in the IG-ON state.

As illustrated in FIG. 6, the ECU 16 determines whether the parking assistance flag F1 is set to the ON state (STEP70). Then, when it is determined that the parking assistance flag F1 is set to the ON state (YES in STEP70), the ECU 16 sets the start threshold value Pstart to Ps1 (STEP80). On the other hand, when it is determined that the parking assistance flag F1 is set to the OFF state (NO in STEP70), the ECU 16 sets the start threshold value Pstart to Ps0 (STEP90). Here, Ps1 is a value greater than Ps0.

The "engine start/stop switching control," the "parking assistance control," and the "start threshold value Pstart setting control" of which sequences are independently performed have been described hitherto. Linkage of the controls will be described below.

As illustrated in FIG. 4, when the parking assistance control is performed, the parking assistance flag F1 is set to the ON state (STEP180). Accordingly, in the start threshold value Pstart setting control illustrated in FIG. 6, the start threshold value Pstart is set to "Ps1" (STEP80). Then, in the engine start/stop switching control illustrated in FIG. 3, "Ps1" is read as the start threshold value Pstart (STEP35) and it is determined whether the required vehicle power Pv is equal to or greater than Ps1 (STEP40).

On the other hand, when the parking assistance control is not being performed, the parking assistance flag F1 is set to the OFF state, and the start threshold value Pstart is set to Ps0 in FIG. 6 (STEP90). In the engine start/stop switching control illustrated in FIG. 3, Ps0 is acquired as the start threshold value Pstart (STEP35) and it is determined whether the required vehicle power Pv is equal to or greater than Ps0 (STEP40).

Here, since Ps1 set when the parking assistance is being performed is greater than Ps0 set when the parking assistance is not being performed, the determination result of STEP40 illustrated in FIG. 3 during parking assistance is likely to be "NO" and the engine 10 is likely to be stopped or the stopped state thereof is likely to be maintained (STEP45).

In this way, in the hybrid vehicle 1 according to the first embodiment, it is possible to stop the engine 10 or to prevent starting of the engine 10 during parking assistance. Accordingly, it is possible to prevent starting of the engine 10 during parking assistance and to prevent the user 3 from feeling uneasy in starting of the engine 10.

Second Embodiment

In the hybrid vehicle 1 according to the first embodiment, by setting the engine start threshold value when the parking assistance is being performed to be greater than the engine start threshold value when the parking assistance is not being performed, starting of the engine 10 is prevented during parking assistance.

On the other hand, in a hybrid vehicle 1 according to a second embodiment, starting of the engine 10 is prevented by not changing the engine start threshold value, prohibiting driving of the air conditioner during parking assistance, and decreasing the required vehicle power Pv.

The hybrid vehicle according to the second embodiment will be described below with reference to FIG. 7 and FIGS. 1 to 6.

In the hybrid vehicle 1 according to the second embodiment, the "engine start/stop switching control" illustrated in FIG. 3 and the "parking assistance control" illustrated in FIG. 4 are performed.

In the hybrid vehicle 1 according to the second embodiment, the start threshold value Pstart setting control illustrated in FIG. 6 is not being performed and the start threshold value Pstart is set to Ps0.

Figure 7:
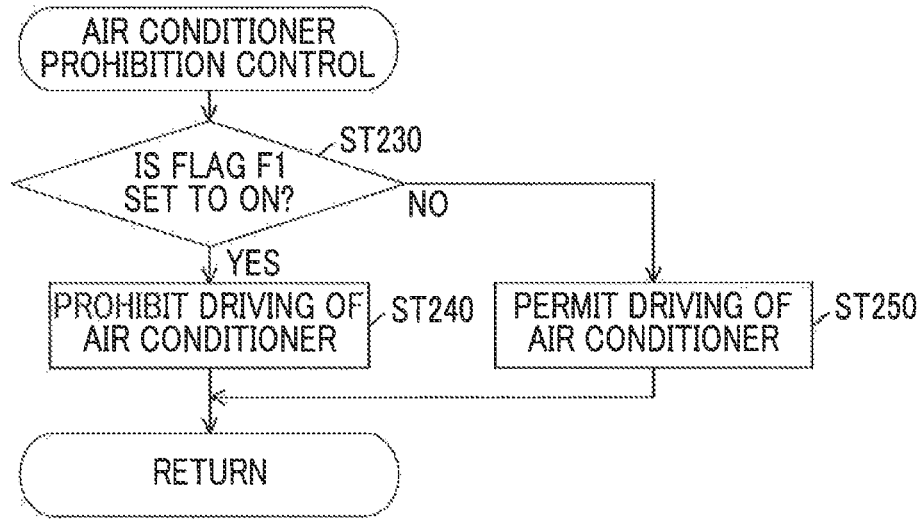
FIG. 7 is a flowchart illustrating air conditioner prohibition control.

In the hybrid vehicle according to the second embodiment, air conditioner prohibition control is performed. FIG. 7 is a flowchart illustrating the air conditioner prohibition control. As illustrated in FIG. 7, the ECU 16 determines whether the parking assistance flag F1 is set to the ON state (STEP230). The ECU 16 prohibits driving of the air conditioner (STEP240) when the parking assistance flag F1 is set to the ON state (YES in STEP230), and permits driving of the air conditioner (STEP250) when the parking assistance flag F1 is set to the OFF state (NO in STEP230). Prohibition of driving of the air conditioner 15 means that the air conditioner 15 is stopped when the air conditioner 15 has been driven and the stopped state of the air conditioner is maintained when the air conditioner 15 has been stopped.

Linkage of the "engine start/stop switching control," the "parking assistance control," and the "air conditioner prohibition control" will be described below.

When the parking assistance control illustrated in FIG. 4 is performed, the parking assistance flag F1 is set to the ON state (STEP180) and driving of the air conditioner is prohibited in the air conditioner prohibition control illustrated in FIG. 7 (STEP240).

In the engine start/stop switching control illustrated in FIG. 3, the required vehicle power Pv is set (STEP30). The required vehicle power Pv is calculated by summing the traveling power Pdrv, the required charging/discharging power Pb, and the power for an auxiliary machine such as the air conditioner 15.

Then, the ECU 16 acquires Ps0 as the start threshold value Pstart (STEP35), and the ECU 16 determines whether the required vehicle power Pv is equal to or greater than Ps0 (STEP40).

The ECU 16 starts the engine 10 (STEP50) when the required vehicle power Pv is equal to or greater than Ps0, and the ECU 16 stops the engine 10 (STEP45) when the required vehicle power Pv is less than Ps0.

In the hybrid vehicle having the above-mentioned configuration, the air conditioner 15 is not driven during parking assistance. Accordingly, the required vehicle power Pv during parking assistance is likely to be less than the required vehicle power Pv when the parking assistance is not being performed. As a result, in STEP40 illustrated in FIG. 3, the ECU 16 is likely to determine that the required vehicle power Pv is less than the start threshold value Pstart (Ps0) and is likely to stop the engine 10 (STEP45).

Accordingly, in the hybrid vehicle 1 according to the second embodiment, it is also possible to prevent driving of the engine 10 during parking assistance. As a result, it is possible to prevent the user 3 from feeling uneasy due to driving of the engine 10 during parking assistance.

In the hybrid vehicle 1 according to the second embodiment, the engine start threshold value is not changed, but the engine start threshold value may be increased during parking assistance as in the hybrid vehicle 1 according to the first embodiment. In the second embodiment, the air conditioner includes both cooling and heating.

Third Embodiment

In the hybrid vehicle 1 according to the second embodiment, starting of the engine 10 is prevented during parking assistance by prohibiting driving of the air conditioner 15 during parking assistance. On the other hand, in a hybrid vehicle according to a third embodiment, starting of the engine 10 is prevented by decreasing a threshold temperature at which the engine 10 is started when the temperature of the engine 10 is low, when the parking assistance control is performed.

The hybrid vehicle 1 according to the third embodiment will be described below with reference to FIGS. 8 and 9 and FIGS. 1 to 5.

In the hybrid vehicle 1 according to the third embodiment, the engine start/stop switching control, the parking assistance control, and warm-up temperature setting control are performed. The parking assistance control in the third embodiment is the same as the parking assistance control in the first embodiment illustrated in FIG. 4.

Figure 8:
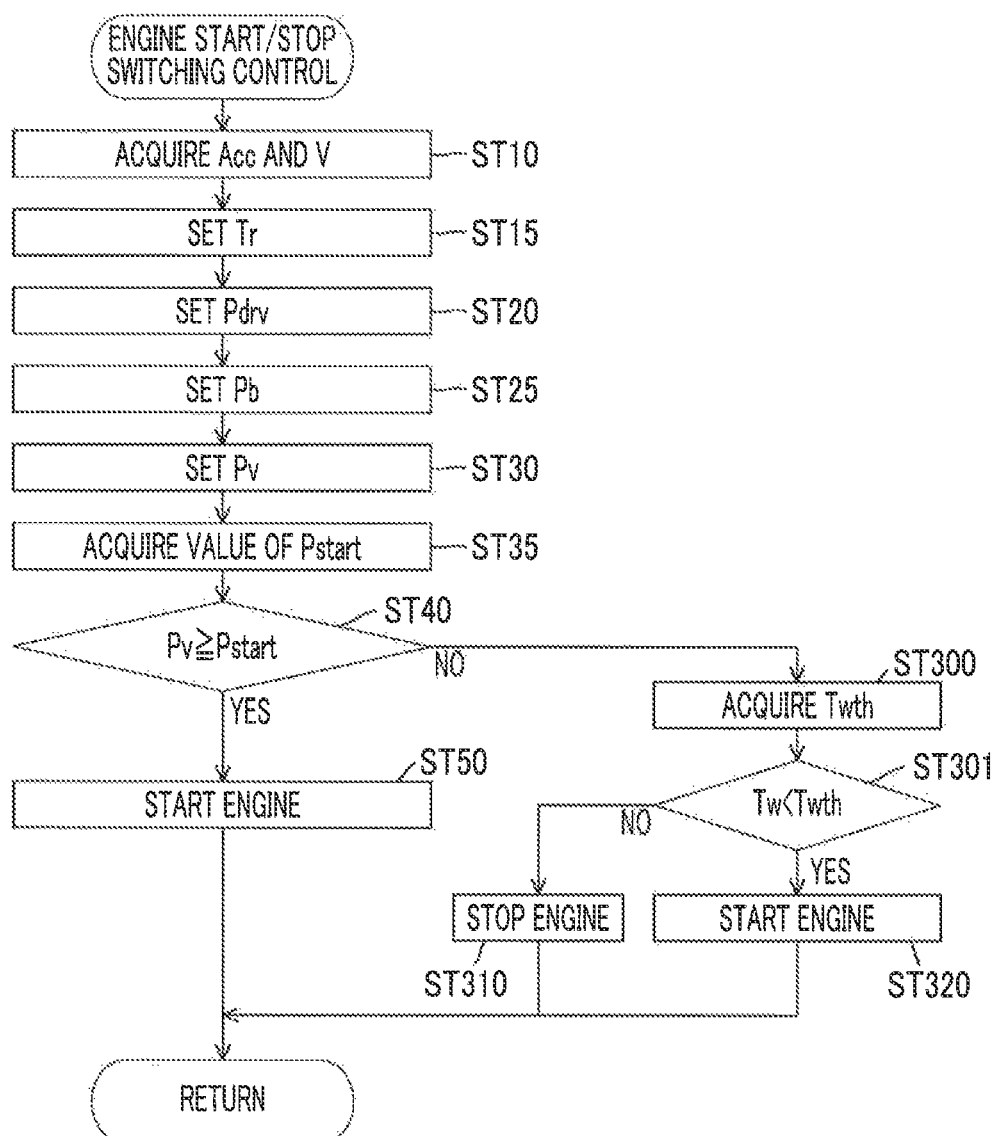
FIG. 8 is a flowchart illustrating engine start/stop switching control which is performed by the hybrid vehicle according to an embodiment.

FIG. 8 is a flowchart illustrating the engine start/stop switching control which is performed by the hybrid vehicle 1 according to the third embodiment. The engine start/stop switching control in the third embodiment is different from the engine start/stop switching control in the first embodiment, in STEP300 to STEP320. Therefore, STEP300 to STEP320 will be mainly described below.

After setting the required vehicle power Pv, the ECU 16 acquires the start threshold value Pstart (STEP35). In the third embodiment, Ps0 is set as the start threshold value Pstart. Then, it is determined whether the required vehicle power Pv is equal to or greater than the start threshold value Pstart (Ps0) (STEP40). When it is determined that the required vehicle power Pv is equal to or greater than Ps0 (YES in STEP40), the ECU 16 starts the engine 10.

When the ECU 16 determines that the required vehicle power Pv is less than Ps0 (NO in STEP40), the ECU 16 acquires a coolant threshold temperature Twth (STEP300). Setting of the coolant threshold temperature Twth is set in the warm-up temperature setting control to be described later.

When the coolant threshold temperature Twth is acquired, the ECU 16 determines whether a coolant temperature Tw detected by the temperature sensor 43 is lower than the coolant threshold temperature Twth (STEP301). The ECU 16 starts the engine 10 (STEP320) when the coolant temperature Tw is lower than the coolant threshold temperature Twth (YES in STEP301), and does not start the engine 10 (STEP310) when the coolant temperature Tw is equal to or higher than the coolant threshold temperature Twth (NO in STEP301).

Figure 9:
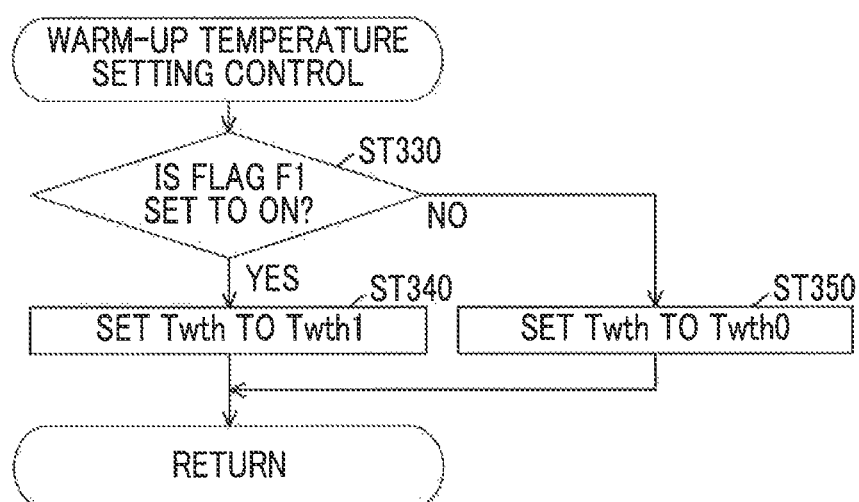
FIG. 9 is a flowchart illustrating warm-up temperature threshold value control.

FIG. 9 is a flowchart illustrating the warm-up temperature setting control. As illustrated in FIG. 9, when the ECU 16 determines that the parking assistance flag F1 is set to the ON state (YES in STEP330), the ECU 16 sets the coolant threshold temperature Twth to Twth1 (STEP340). When it is determined that the parking assistance flag F1 is set to the OFF state (NO in STEP330), the ECU 16 sets the coolant threshold temperature Twth to Twth0 (STEP350). Twth1 is a value smaller than Twth0.

A relationship between the engine start/stop switching control, the parking assistance control, and the warm-up temperature setting control in the third embodiment will be described below.

When the parking assistance control illustrated in FIG. 4 is not being performed, the parking assistance flag F1 is set to the OFF state (STEP205) and the coolant threshold temperature Twth is set to Twth0 in the warm-up temperature setting control illustrated in FIG. 9 (STEP350). In the engine start/stop switching control illustrated in FIG. 8, the ECU 16 acquires Twth0 as the coolant threshold temperature Twth (STEP300). The ECU 16 starts the engine 10 (STEP320) when it is determined that the coolant temperature Tw is lower than Twth0 (YES in STEP315), and stops the engine 10 (STEP310) when it is determined that the coolant temperature Tw is equal to or higher than Twth0 (NO in STEP301).

In this way, when the parking assistance control is not being performed, the required vehicle power Pv is less than the start threshold value Pstart, and the coolant temperature Tw is lower than Twth0, the engine 10 is started to warm up the engine 10.

When the parking assistance control illustrated in FIG. 4 is performed, the parking assistance flag F1 is switched to the ON state (STEP180) and the coolant threshold temperature Twth is set to Twth1 in the warm-up temperature setting control illustrated in FIG. 9 (STEP340). Then, in the engine start/stop switching control illustrated in FIG. 8, when Twth is acquired as the coolant threshold temperature Twth, the ECU 16 acquires Twth1 as the coolant threshold temperature Twth (STEP300).

When it is determined that the coolant temperature Tw is lower than Twth1 (YES in STEP301), the ECU 16 starts the engine 10 (STEP320). On the other hand, when it is determined that coolant temperature Tw is equal to or higher than Twth1 (NO in STEP301), the ECU 16 stops the engine 10 (STEP310).

In this way, when the parking assistance control is performed and the coolant temperature Tw is lower than Twth1, the engine 10 is started to warm up the engine 10.

Since Twth1 is less than Twth0, the coolant temperature Tw is likely to be determined to be higher than the coolant threshold temperature Twth in STEP301 illustrated in FIG. 8 when the parking assistance control is performed. Accordingly, when the parking assistance is being performed, it is harder than start the engine 10 than when the parking assistance is not being performed.

In this way, in the hybrid vehicle 1 according to the third embodiment, starting of the engine 10 during parking assistance is prevented while achieving warm-up of the engine 10, and the user 3 is prevented from feeling uneasy due to starting of the engine 10.

Fourth Embodiment

In the hybrid vehicle 1 according to the third embodiment, starting of the engine 10 is prevented by decreasing the threshold temperature at which the engine 10 is started when the temperature of the engine 10 is low, when the parking assistance control is performed.

On the other hand, in a hybrid vehicle 1 according to the fourth embodiment, the engine 10 is started when the temperature of the rotary electric machine MG2 is higher than a predetermined temperature. When parking assistance is performed, starting of the engine 10 is prevented by setting the predetermined temperature to be higher.

The hybrid vehicle 1 according to the fourth embodiment will be described below with reference to FIGS. 10 and 11 and FIGS. 1 to 5.

In the hybrid vehicle 1 according to the fourth embodiment, the engine start/stop switching control, the parking assistance control, and motor temperature threshold setting control are performed. In the hybrid vehicle 1 according to the fourth embodiment, the start threshold value Pstart setting control in the first embodiment is not being performed and the start threshold value Pstart is set to Ps0. The parking assistance control in the fourth embodiment is the same as the parking assistance control in the first embodiment illustrated in FIG. 4.

Figure 10:
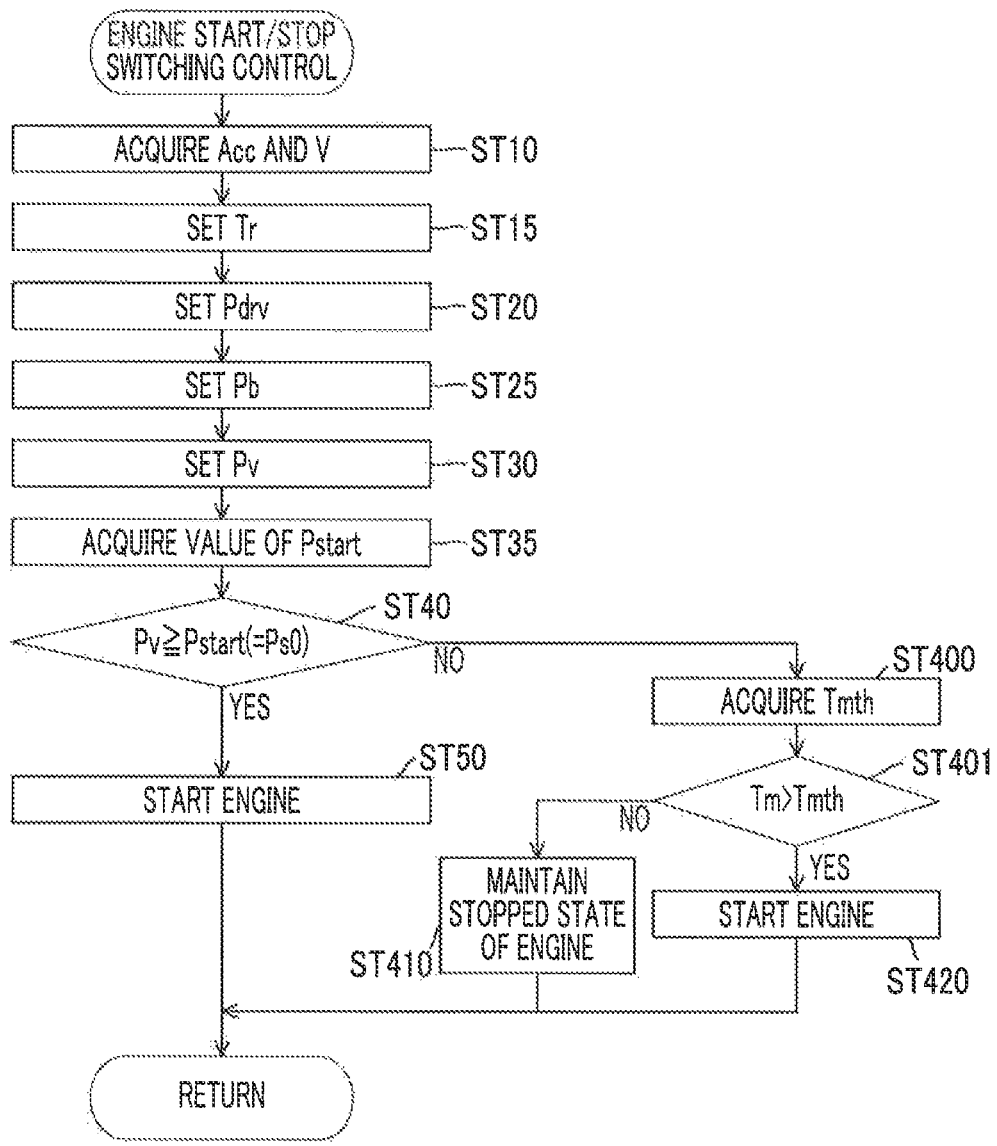
FIG. 10 is a flowchart illustrating engine start/stop switching control in a hybrid vehicle according to an embodiment.

FIG. 10 is a flowchart illustrating the engine start/stop switching control in the hybrid vehicle 1 according to the fourth embodiment.

The engine start/stop switching control in the fourth embodiment is different from the engine start/stop switching control in the first embodiment, in STEP400 to STEP420. Therefore, STEP400 to STEP420 will be mainly described below.

When it is determined that the required vehicle power Pv is less than Ps0 (NO in STEP40), the ECU 16 acquires a threshold temperature Tmth (STEP400). The threshold temperature Tmth is set by the motor temperature threshold setting control and details thereof will be described later.

The ECU 16 determines whether a motor temperature Tm is higher than the threshold temperature Tmth (STEP401), and starts the engine 10 (STEP420) when it is determined that the motor temperature Tm is higher than the threshold temperature Tmth (YES in STEP401). On the other hand, when it is determined that the motor temperature Tm is equal to or lower than the threshold temperature Tmth (NO in STEP401), the ECU 16 stops the engine 10 (STEP410).

Figure 11:
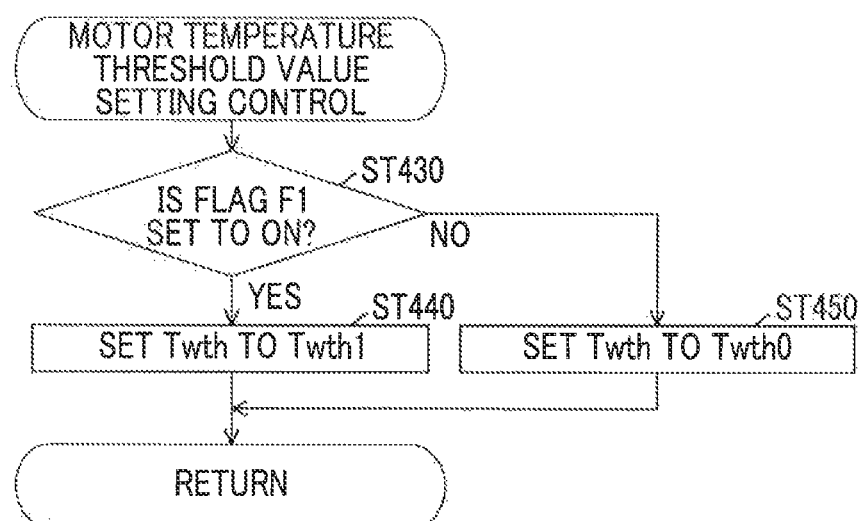
FIG. 11 is a flowchart illustrating motor temperature threshold value setting control.

The motor temperature threshold setting control will be described below. FIG. 11 is a flowchart illustrating the motor temperature threshold setting control. As illustrated in FIG. 11, when it is determined that the parking assistance flag F1 is set to the ON state (YES in STEP430), the ECU 16 sets the threshold temperature Tmth to Tmth1 (STEP440). When it is determined that the parking assistance flag F1 is set to the OFF state, the ECU 16 sets the threshold temperature Tmth to Tmth0 (STEP450). Tmth1 is a value greater than Tmth0.

Linkage of the "engine start/stop switching control," the "parking assistance control," and the "motor temperature threshold setting control" will be described below with reference to FIGS. 4, 10, and 11.

When the parking assistance control illustrated in FIG. 4 is not being performed, the parking assistance flag F1 is set to the OFF state and Tmth0 is set as the threshold temperature Tmth in the motor temperature threshold setting control illustrated in FIG. 11 (STEP450).

In STEP400 illustrated in FIG. 10, Tmth0 is set as the threshold temperature Tmth. The engine 10 is started (STEP420) when the motor temperature Tm is higher than Tmth0, and the engine 10 is stopped (STEP410) when the motor temperature Tm is equal to or lower than Tmth0.

In this way, when the motor temperature Tm of the rotary electric machine MG2 is high, the engine 10 is started and it is thus possible to reduce a load of the rotary electric machine MG2 and to achieve deterioration prevention of the rotary electric machine MG2.

When the parking assistance control is performed, the parking assistance flag F1 is set to the ON state in STEP180 illustrated in FIG. 4. Accordingly, in the motor temperature threshold setting control illustrated in FIG. 11, the parking assistance flag F1 is set to the ON state and thus Tmth1 is set as the threshold temperature Tmth (STEP440).

In the engine start/stop switching control illustrated in FIG. 10, the ECU 16 acquires Tmth1 as the threshold temperature Tmth (STEP400). The engine 10 is started (STEP420) when the motor temperature Tm is higher than Tmth1 (YES in STEP401), and the engine 10 is stopped (STEP410) when the motor temperature Tm is equal to or lower than Tmth1 (NO in STEP401).

Tmth1 is greater than Tmth0. Accordingly, in the engine start/stop switching control illustrated in FIG. 10, the motor temperature Tm is likely to be lower than Tmth1 and the engine 10 is likely to be stopped (STEP410).

In this way, in the hybrid vehicle 1 according to the fourth embodiment, protection of the rotary electric machine MG2 is achieved when the motor temperature Tin of the rotary electric machine MG2 increases, starting of the engine 10 is prevented when the parking assistance control is performed, and it is thus possible to prevent the user 3 from feeling uneasy due to starting of the engine 10 during parking assistance. (Fifth Embodiment) In the fourth embodiment, during the parking assistance, starting of the engine 10 during parking assistance is prevented by increasing the threshold temperature Tmth. In the hybrid vehicle 1 according to the fifth embodiment, the battery 14 is charged with the driving force of the engine 10 when the SOC of the battery 14 is less than a threshold value, and starting of the engine 10 for charging is prevented by decreasing the threshold value during parking assistance. The hybrid vehicle 1 according to the fifth embodiment will be described below with reference to FIGS. 12 and 13 and FIGS. 1 to 5.

In the hybrid vehicle 1 according to the fifth embodiment, the engine start/stop switching control, the parking assistance control, and threshold value SOCth setting control are performed. In the hybrid vehicle 1 according to the fifth embodiment, the start threshold value Pstart setting control in the first embodiment is not being performed and the start threshold value Pstart is set to Ps0. The parking assistance control in the fifth embodiment is the same as the parking assistance control in the first embodiment illustrated in FIG. 4.

Figure 12:
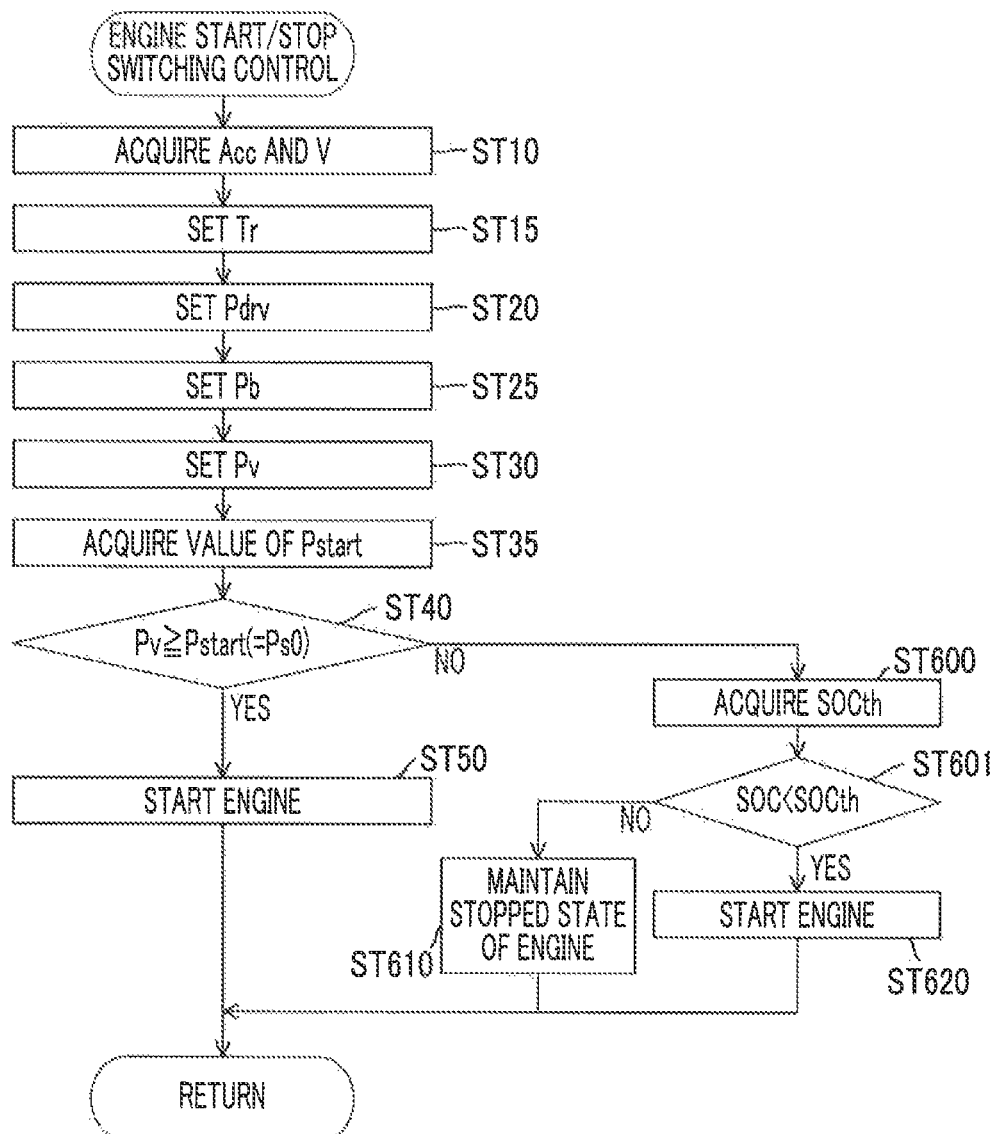
FIG. 12 is a flowchart illustrating engine start/stop switching control according to an embodiment.

FIG. 12 is a flowchart illustrating the engine start/stop switching control according to the fifth embodiment. The engine start/stop switching control in the fifth embodiment is different from the engine start/stop switching control in the first embodiment, in STEP600 to STEP620. Therefore, STEP300 to STEP320 will be mainly described below.

The ECU 16 acquires Ps0 as the start threshold value Pstart (STEP35), and starts the engine 10 (STEP50) when it is determined that the required vehicle power Pv is equal to or greater than Ps0 (YES in STEP35).

The ECU 16 acquires the threshold value SOCth (STEP600) when it is determined that the required vehicle power Pv is less than Ps0 (NO in STEP40). The threshold value SOCth is set in the threshold value SOCth setting control to be described later and details thereof will be described later.

When it is determined that the SOC is less than the threshold value SOCth (YES in STEP601), the ECU 16 starts the engine 10 (STEP620). The rotary electric machine MG1 generates power with the driving force from the engine 10 to charge the battery 14.

When the ECU 16 determines that the SOC is equal to or greater than the threshold value SOCth (NO in STEP601), the ECU 16 stops the engine 10 (STEP610). At this time, when the engine 10 is originally stopped, the stopped state of the engine 10 is maintained.

Figure 13:
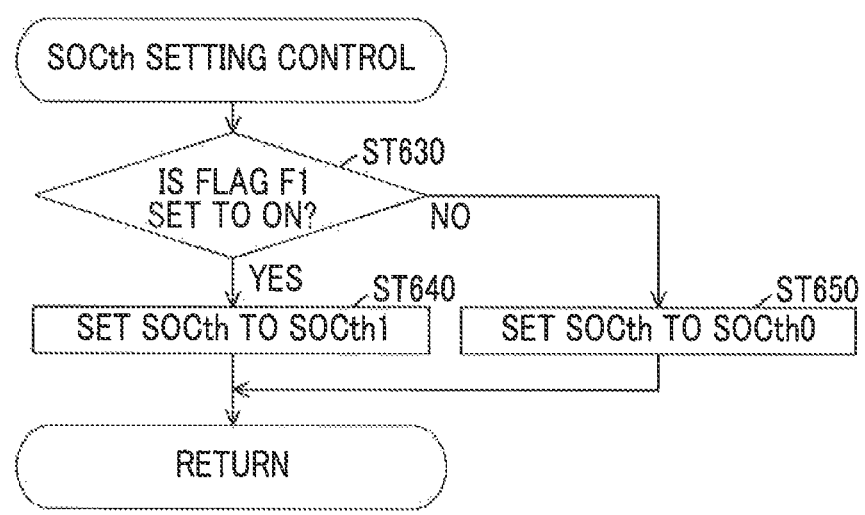
FIG. 13 is a flowchart illustrating threshold value setting control.

The threshold value SOCth setting control will be described below with reference to FIG. 13. FIG. 13 is a flowchart illustrating the threshold value SOCth setting control.

As illustrated in FIG. 13, when it is determined that the parking assistance flag F1 is set to the ON state (YES in STEP630), the ECU 16 sets the threshold value SOCth to SOCth1 (STEP640). When it is determined that the parking assistance flag F1 is set to the OFF state (NO in STEP650), the ECU 16 sets the threshold value SOCth to SOCth0 (STEP650).

Linkage of the "engine start/stop switching control," the "parking assistance control," and the "threshold value SOCth setting control" will be described below with reference to FIGS. 4, 12, and 13.

When the parking assistance control is not being performed, the parking assistance flag F1 is set to the OFF state and SOCth0 is set as the threshold value SOCth in the threshold value SOCth setting control illustrated in FIG. 13 (STEP650). In STEP600 of the engine start/stop switching control illustrated in FIG. 12, the ECU 16 acquires SOCth0 as the threshold value SOCth. The engine 10 is stopped (STEP610) when the SOC is equal to or greater than SOCth0, and the engine 10 is started (STEP620) when the SOC is less than SOCth0 (YES in STEP601).

In this way, when the SOC decreases, the ECU 16 causes the rotary electric machine MG1 to generate power to charge the battery 14 using the driving force of the engine 10, and prevents an excessive decrease in the SOC.

When the parking assistance control illustrated in FIG. 4 is performed, the parking assistance flag F1 is set to the ON state (STEP180). When the parking assistance flag F1 is set to the ON state, SOCth1 is set as the threshold value SOCth in the threshold value SOCth setting control illustrated in FIG. 13 (STEP640).

In STEP600 of the engine start/stop switching control illustrated in FIG. 12, the ECU 16 acquires SOCth1 as the threshold value SOCth (STEP600). The ECU 16 stops the engine 10 (STEP610) when it is determined that the SOC is equal to or greater than SOCth1, and starts the engine 10 (STEP620) when it is determined that the SOC is less than SOCth1.

SOCth1 is a value less than SOCth0. Accordingly, when the parking assistance control is performed, the SOC is likely to be determined to be equal to or greater than the threshold value SOCth in STEP601 in FIG. 12 (STEP601), thereby preventing starting of the engine 10.

In this way, in the hybrid vehicle 1 according to the fifth embodiment, it is possible to prevent an excessive decrease in the SOC of the battery 14, it is possible to prevent starting of the engine 10 when the parking assistance control is performed and to prevent the user 3 from feeling uneasy due to the starting of the engine 10 during parking assistance.

(Sixth Embodiment) In the hybrid vehicle 1 according to the fifth embodiment, starting of the engine 10 during parking assistance is prevented by decreasing the threshold value SOCth when the parking assistance is performed. On the other hand, in a hybrid vehicle 1 according to a sixth embodiment, a CD mode to be described later is selected during parking assistance.

In the hybrid vehicle 1, as part of traveling control, a traveling mode is switched between a charge sustaining (CS) mode in which the SOC of the battery 14 is maintained at a constant level and a charge depletion (CD) mode in which the hybrid vehicle 1 travels actively using the energy of the battery 14.

In the CS mode, traveling of the hybrid vehicle 1 is controlled such that the SOC is sustained, for example, the SOC is sustained within a predetermined range including a control center. That is, in the CS mode, the battery 14 is charged by regenerative power generation at the time of deceleration of the vehicle and the battery 14 is also charged by electric power generated using the output of the engine 10 for increasing the SOC. Specifically, when the SOC is lower than the control center, the engine 10 is activated to charge the battery 14. At this time, the engine 10 is controlled to output a charging power of the battery 14 in addition to a power for vehicle traveling. That is, in the CS mode, even when a vehicle traveling power can be guaranteed by EV driving at the time of a low speed, there is a possibility that the engine 10 will be activated to charge the battery 14.

On the other hand, in the CD mode, traveling of the hybrid vehicle 1 is controlled such that the SOC decreases with an increase in traveling distance without sustaining the SOC. In the CD modes, the battery 14 is charged only by regenerative power generation at the time of deceleration of the vehicle, and activation of the engine 10 for charging the battery 14 is prevented.

In the CD mode, when a high output power is required for the vehicle by greatly depressing the accelerator pedal, the engine 10 can be activated. However, in the CD mode, since opportunities for EV driving becomes more than in the CS mode, the activation frequency of the engine 10 becomes less. As a result, in the CD mode, the hybrid vehicle 1 travels actively using the energy accumulated in the battery 14.

The hybrid vehicle 1 according to the fifth embodiment, CD/CS mode selection control and parking assistance control are performed. In the parking assistance control in the sixth embodiment is the same as the parking assistance control, in the first embodiment illustrated in FIG. 4. Accordingly, when the parking assistance control is performed, the parking assistance flag F1 is set to the ON state (STEP180).

Figure 14:
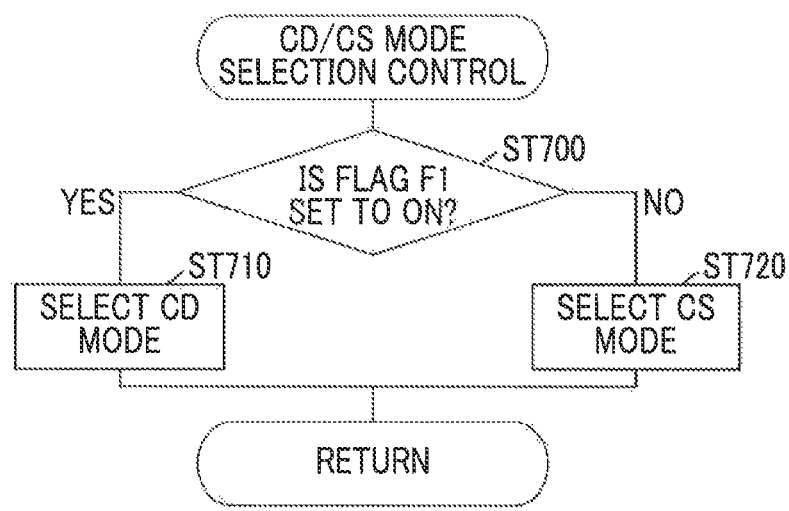
FIG. 14 is a flowchart illustrating CD/CS mode selection control according to an embodiment.

The CD/CS mode selection control in the sixth embodiment will be described below with reference to FIG. 14. As illustrated in FIG. 14, the ECU 16 selects the CD mode (STEP710) when the parking assistance flag F1 is set to the ON state (STEP700), and selects the CS mode (STEP720) when the parking assistance flag F1 is set to the OFF state.

The CD mode is a mode in which the energy accumulated in the battery 14 is actively used and starting of the engine 10 is prevented. Accordingly, starting of the engine 10 is prevented while the parking assistance control is performed. As a result, it is possible to prevent starting of the engine 10 during parking assistance and to prevent the user 3 from feeling uneasy due to starting of the engine 10.

Seventh Embodiment

In the hybrid vehicle 1 according to the sixth embodiment, starting of the engine 10 during parking assistance is prevented by selecting the CD mode during parking assistance. On the other hand, in a hybrid vehicle 1 according to a seventh embodiment, a point at which parking assistance has been performed is stored as an assistance history point. When the hybrid vehicle 1 arrives at the assistance history point, the SOC of the battery 14 is controlled such that the parking assistance can be performed using the power from the battery 14.

The hybrid vehicle 1 according to the seventh embodiment will be described below with reference to FIGS. 15 and 16 and FIG. 2.

As illustrated in FIG. 2, the hybrid vehicle 1 includes a car navigation system 80, and the ECU 16 stores a point in which the parking assistance control was performed in the past as a history point. The history point may be stored when the number of times in which the parking assistance has been performed is equal to or greater than a predetermined number of times. The history point may be input by an input from the user 3.

The ECU 16 stores an amount of power required for the parking assistance when the parking assistance was performed using only the power from the rotary electric machine MG2 at each history point.

Figure 15:
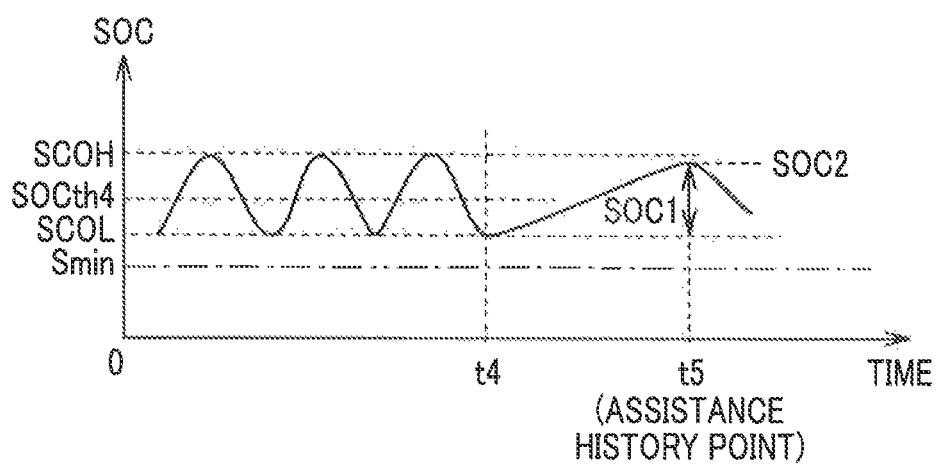
FIG. 15 is a graph illustrating a changing state of an SOC while a hybrid vehicle is traveling.

FIG. 15 is a graph illustrating a changing state of the SOC while the hybrid vehicle 1 is traveling. As illustrated in a period up to time t4 in FIG. 15, the ECU 16 starts the engine 10 to charge the battery 14 when the SOC indicating the state of charge of the battery 14 is less than SOCL. The ECU 16 discharges power from the battery 14 when the SOC is greater than SOCH.

Figure 16:
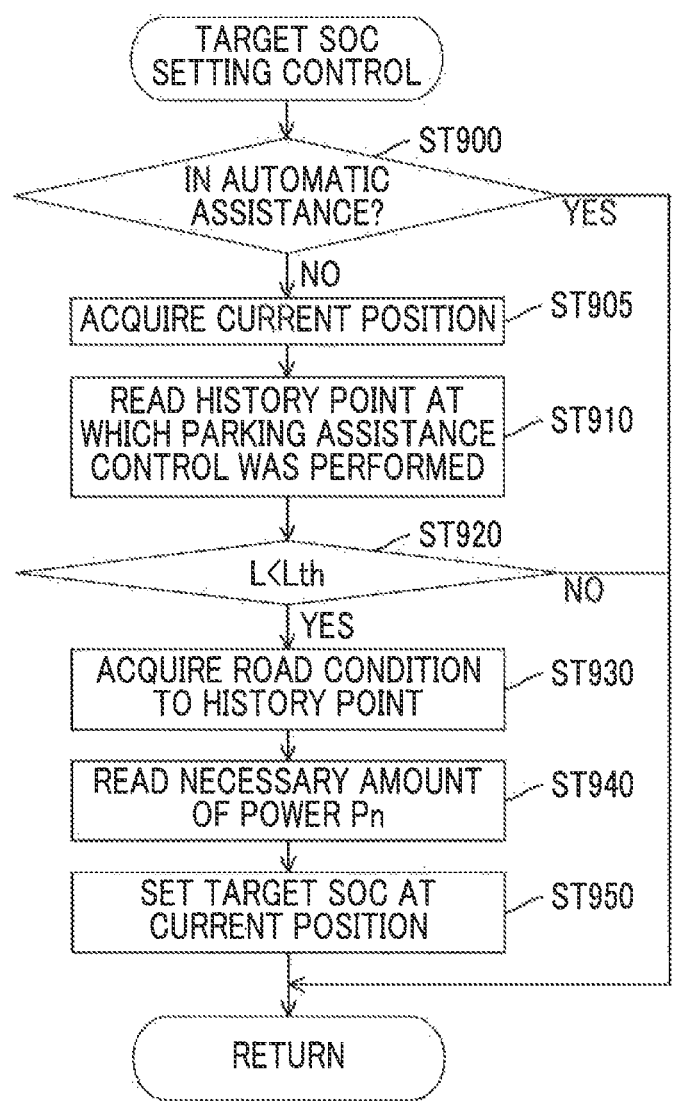
FIG. 16 is a flowchart illustrating target SOC setting control while a hybrid vehicle is traveling.

FIG. 16 is a flowchart illustrating target SOC setting control while the hybrid vehicle 1 is traveling. The target SOC setting control is control which is repeatedly performed at predetermined time intervals while the hybrid vehicle 1 is traveling.

As illustrated in FIG. 16, the ECU 16 determines whether the parking assistance control is performed (STEP900), and temporarily comes out of the parking assistance control when the parking assistance control is being performed. When the parking assistance control is not being performed (NO in STEP900), the ECU 16 acquires a current position of the hybrid vehicle 1 based on information from the car navigation system 80 (STEP905).

Then, the ECU 16 reads a history point at which the parking assistance control was performed in the past (STEP910). The ECU 16 calculates a distance L between the history point and the current position, and determines whether the distance L is shorter than a threshold distance Lth (STEP920). When it is determined that the distance L is equal to or greater than the threshold distance Lth (NO in STEP920), the ECU 16 temporarily comes out of the setting control.

On the other hand, when it is determined that the distance L is shorter than the threshold distance Lth (YES in STEP920), the ECU 16 acquires a road condition from the current position to the history point based on the information from the car navigation system 80 (STEP930). The road condition includes information such as the distance from the current position to the history point and a road gradient.

The ECU 16 reads a necessary amount of power Pn required when the parking assistance is performed using only the driving force from the rotary electric machine MG2 at the history point (STEP940).

The ECU 16 sets a target SOC at the current position from the road condition from the current position to the history point and the necessary amount of power Pn (STEP950). Specifically, the ECU 16 calculates parking assistance SOC1 by dividing the necessary amount of power Pn by the capacity of the battery 14, and sets a value obtained by the parking assistance SOC1 to SOCL as arrival SOC2. The target SOC at the current position is set from the road condition from the current position to the history point and the arrival SOC2 such that the SOC when the hybrid vehicle 1 arrives at the history point is the arrival SOC2. Power generation by the engine 10 is performed such that the SOC of the battery 14 reaches the target SOC.

By setting the target SOC at the current position in this way, it is possible to prevent starting of the engine 10 when the parking assistance is performed at the history point.

In this specification, the "parking operation of the hybrid vehicle" includes all parking operations from a parking start timing of the hybrid vehicle to a parking completion timing, and the "parking operation of the hybrid vehicle" includes a user's parking operation of the hybrid vehicle or a parking assistance request from the user. The "parking assistance" includes fully automatic parking assistance in which the ECU 16 performs all parking operations from a parking start to a parking end and partially automatic parking assistance in which some of the parking operations are performed by a user.

While exemplary embodiments of the disclosure have been described above, the disclosure is not limited to the embodiments. For example, in the first embodiment or the like, the user 3 instructs the parking assistance using the mobile terminal 4 from the outside of the hybrid vehicle 1, but the user 3 may instruct the hybrid vehicle 1 to perform the parking assistance from the inside of the hybrid vehicle 1. It should be thought that the above-disclosed embodiments are exemplary but not restrictive from all points of view. The scope of the disclosure is defined by the appended claims, not by the above description, and is intended to include all modifications within meanings and scope equivalent to the claims.

The disclosure can be applied to hybrid vehicles.

What is claimed is:

1. A hybrid vehicle comprising:
   a battery;
   an engine;
   a rotary electric machine electrically connected to the battery, the rotary electric machine mechanically connected to the engine; and
   an electronic control unit configured to
      determine whether or not parking operation of the hybrid vehicle is being performed, wherein the parking operation includes a parking control by a user and a parking assistance request from the user,
      control the engine and the rotary electric machine such that starting the engine when the parking operation of the hybrid vehicle is being performed is harder than starting the engine when the parking operation of the hybrid vehicle is not being performed,
      perform a parking assistance control for assisting parking of the hybrid vehicle to a target parking position when the parking assistance request is issued,
      perform control for starting the engine when a required power required for the hybrid vehicle is equal to or greater than a start threshold value, and
      set the start threshold value such that the start threshold value when the parking assistance control is being performed is greater than the start threshold value when the parking assistance control is not being performed.

2. The hybrid vehicle according to claim 1, further comprising a detector configured to detect a temperature of the engine,
   wherein the electronic control unit is configured to
   (i) perform control for starting the engine when the temperature detected by the detector is lower than a predetermined temperature, and
   (ii) set the predetermined temperature such that the predetermined temperature when the parking assistance control is being performed is lower than the predetermined temperature when the parking assistance control is not being performed.

3. The hybrid vehicle according to claim 1, further comprising a detector configured to detect a temperature of the rotary electric machine,
wherein the electronic control unit is configured to
(i) perform control for starting the engine when the temperature detected by the detector is higher than a predetermined temperature, and
(ii) set the predetermined temperature such that the predetermined temperature when the parking assistance control is being performed is higher than the predetermined temperature when the parking assistance control is not being performed.

4. The hybrid vehicle according to claim 1, wherein the electronic control unit is configured to
(i) perform control for causing the rotary electric machine to generate power with a driving force from the engine and charging the battery when a value indicating a state of charge of the battery is less than a threshold value, and
(ii) set the threshold value such that the threshold value when the parking assistance control is being performed is less than the threshold value when the parking assistance control is not being performed.

5. The hybrid vehicle according to claim 1, further comprising an air conditioner configured to be driven with power from the battery, wherein
the electronic control unit is configured to
(i) perform control for starting the engine when the required power required for the hybrid vehicle and including electric power required for driving the air conditioner is equal to or greater than the start threshold value, and
(ii) perform control for prohibiting driving of the air conditioner when the parking assistance control is being performed.

6. The hybrid vehicle according to claim 1, wherein the electronic control unit is configured to
(i) perform control for causing the hybrid vehicle to travel while switching between a charge depleting mode and a charge sustaining mode, and
(ii) select the charge depleting mode when the parking assistance control is being performed.

7. A hybrid vehicle comprising:
a battery;
an engine configured to output power;
a rotary electric machine electrically connected to the battery, the rotary electric machine mechanically connected to the engine;
an air conditioner configured to be driven with power from the battery; and
an electronic control unit configured to
(i) perform parking assistance control for causing the hybrid vehicle to travel to a target parking position when a parking assistance request is issued from a user,
(ii) perform control for starting the engine when a required power required for the hybrid vehicle including electric power required for driving the air conditioner is equal to or greater than a start threshold value, and
(iii) perform control for prohibiting driving of the air conditioner when the parking assistance control is being performed.

8. A hybrid vehicle comprising:
a battery;
an engine configured to output power;
a rotary electric machine electrically connected to the battery, the rotary electric machine mechanically connected to the engine; and
an electronic control unit configured to
(i) perform control for causing the hybrid vehicle to travel while switching between a charge depleting mode and a charge sustaining mode,
(ii) perform parking assistance control for causing the hybrid vehicle to travel to a target parking position when a parking assistance request is issued from a user, and
(iii) select the charge depleting mode when the parking assistance control is being performed.

9. A hybrid vehicle comprising:
a battery;
an engine configured to output power;
a rotary electric machine electrically connected to the battery, the rotary electric machine mechanically connected to the engine; and
an electronic control unit configured to
(i) perform parking assistance control for causing the hybrid vehicle to travel to a target parking position when a parking assistance request is issued from a user,
(ii) perform control for causing the rotary electric machine to generate power with a driving force from the engine and charging the battery when a value indicating a state of charge of the battery is less than a threshold value,
(iii) store a point at which the parking assistance control has been performed as an assistance history point, and
(iv) perform control for charging the battery when a distance between the assistance history point and the hybrid vehicle is equal to or less than a predetermined distance such that the value indicting the state of charge of the battery when the hybrid vehicle reaches the assistance history point is equal to or greater than a predetermined value obtained by adding an amount of power required for the parking assistance control to the threshold value.

10. A control method for a hybrid vehicle, the hybrid vehicle including,
a battery,
an engine,
a rotary electric machine electrically connected to the battery, the rotary electric machine mechanically connected to the engine, and
an electronic control unit,
the control method comprising
determining, by the electronic control unit, whether or not parking operation of the hybrid vehicle is being performed, wherein the parking operation includes a parking control by a user and a parking assistance request from the user,
controlling, by the electronic control unit, the engine and the rotary electric machine such that starting the engine when the parking operation of the hybrid vehicle is being performed is harder than starting the engine when the parking operation of the hybrid vehicle is not being performed,
performing a parking assistance control for assisting parking of the hybrid vehicle to a target parking position when the parking assistance request is issued,
performing control for starting the engine when a required power required for the hybrid vehicle is equal to or greater than a start threshold value, and setting the start threshold value such that the start threshold value when the parking assistance control is being performed is greater than the start threshold value when the parking assistance control is not being performed.

* * * * *